US012748767B2

(12) United States Patent
Kim et al.

(10) Patent No.: US 12,748,767 B2
(45) Date of Patent: Sep. 29, 2026

(54) METHOD AND SYSTEM FOR CONFIGURING RETRIEVAL-AUGMENTED GENERATION

(71) Applicant: LINE Plus Corporation, Seongnam-si (KR)

(72) Inventors: Hyun Hak Kim, Seongnam-si (KR); Hee Cheol Park, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 19/065,629

(22) Filed: Feb. 27, 2025

(65) Prior Publication Data

US 2025/0335454 A1 Oct. 30, 2025

(30) Foreign Application Priority Data

Apr. 30, 2024 (KR) ........................ 10-2024-0057658

(51) Int. Cl.
*G06F 16/00* (2019.01)
*G06F 16/16* (2019.01)
*G06F 16/22* (2019.01)
*G06F 16/248* (2019.01)

(52) U.S. Cl.
CPC ............ *G06F 16/248* (2019.01); *G06F 16/16* (2019.01); *G06F 16/2237* (2019.01)

(58) Field of Classification Search
CPC ..... G06F 16/248; G06F 16/2237; G06F 16/16
USPC .................................................. 707/600–899
See application file for complete search history.

(56) References Cited

U.S. PATENT DOCUMENTS 12,450,217 B1 * 10/2025 Godbole ................. G06F 40/40
2025/0094398 A1 * 3/2025 Czarlinska ............ G06F 16/316
2025/0111091 A1 * 4/2025 Saligrama Shreeram ................... G06F 21/629
2025/0238470 A1 * 7/2025 Penta .................... G06F 16/907
2025/0265253 A1 * 8/2025 Deepak ............... G06F 16/2425
2025/0278415 A1 * 9/2025 Mui .................... G06F 16/9024
2025/0291854 A1 * 9/2025 Ho .......................... G06F 16/93
2025/0298721 A1 * 9/2025 Berg ..................... G06F 16/338

FOREIGN PATENT DOCUMENTS

KR 10-2648139 B1 3/2024

* cited by examiner

*Primary Examiner* — Michelle N Owyang
(74) *Attorney, Agent, or Firm* — Harness, Dickey & Pierce, P.L.C.

(57) ABSTRACT

Disclosed is a method and system for configuring retrieval-augmented generation (RAG). A RAG configuration method may include providing a user with a user interface that allows the user to enter a file path for configuration of RAG or to select elements predefined for configuration of the RAG; configuring the RAG for the user using a file acquired through the file path entered through the user interface or elements selected by the user from among the predefined elements through the user interface; generating a response to a query of the user entered through the user interface using the configured RAG and an artificial intelligence (AI) model; and providing the generated response to the user through the user interface.

13 Claims, 10 Drawing Sheets

METHOD AND SYSTEM FOR CONFIGURING RETRIEVAL-AUGMENTED GENERATION

CROSS-REFERENCE TO RELATED APPLICATION(S)

This U.S. non-provisional application and claims the benefit of priority under 35 U.S.C. § 119 to Korean Patent Application No. 10-2024-0057658, filed Apr. 30, 2024, the entire contents of which are incorporated herein by reference in their entirety.

BACKGROUND

Technical Field

Some example embodiments relate to a method and system for configuring retrieval-augmented generation (RAG).

Related Art

As a type of artificial intelligence (AI) trained on a large text data corpus to generate a human-like response to an input, large language models (LLM) are language models configured as an artificial neural network with numerous parameters (usually, billions of weights or more). LLM may be trained with a significant amount of unlabeled text using self-supervised learning or semi-self-supervised learning.

Retrieval-augmented generation (RAG) refers to technology used to supplement an LLM and to mitigate a hallucination phenomenon and supplement untrained knowledge of the LLM, and is a process that improves and/or optimizes the output of the LLM by referring to a trusted knowledge base (e.g., outside a learning data source) before generating a response. Since the RAG extends an already powerful function of the LLM based on internal knowledge of a specific domain or organization, there is no need to retrain the LLM. Therefore, RAG provides a cost-effective approach to improve LLM results and such that LLMs remain relevant, accurate, and useful in various situations.

Conventionally, RAG was configured by writing a source using Python library, such as LangChain and Llama index, but there were obstacles in learning libraries scattered for RAG; for example, a code had to be written, and distribution was difficult. Also, it was necessary to prepare and link infrastructures, such as a vector database and a server, to the LLM; and there were issues of ambiguity regarding which retriever technique to apply. Thereby, solutions to these, and similar, obstacles are being explored.

Reference material includes Korean Patent Registration No. 10-2648139.

SUMMARY

Some example embodiments provide a retrieval-augmented generation (RAG) configuration method and system to provide a function that allows a user to easily configure RAG and immediately use the same for search by combining and setting elements of a standardized process for RAG configuration with no-code.

According to at least one example embodiment, there is provided a retrieval-augmented generation (RAG) configuration method of a computer device including at least one processor, the method including providing, by the at least one processor, a user with a user interface configured to receive, from the user, at least one of a file path for configuration of the RAG, a selection of elements predefined for configuration of the RAG, or a combination thereof; configuring, by the at least one processor, the RAG for the user using at least one of a file acquired through the file path entered through the user interface or elements selected by the user from among the predefined elements; generating, by the at least one processor, a response to a query of the user entered through the user interface using the configured RAG and an artificial intelligence (AI) model; and providing, by the at least one processor, the generated response to the user through the user interface.

According to an aspect, the configuring of the RAG may include configuring a knowledge pipeline for the RAG by linking elements included in the acquired file or the selected elements to actions of the knowledge pipeline, and the generating the response may include sequentially operating workers corresponding to elements linked to the actions in order of the actions of the knowledge pipeline.

According to another aspect, the configuring of the RAG may include configuring a first pipeline according to a combination of first elements, the first elements configured to index data of the user; and configuring a second pipeline according to combination of second elements, the second elements configured to retrieve data of the user to the query of the user.

According to still another aspect, the first elements may include at least two of element configured to acquire the data of the user, an element configured to analyze a syntax of the data of the user, an element configured to extract at least one of a keyword, a summary, or metadata from the data of the user, an element configured to split the data of the user into a plurality of chunks, an element configured to generate a vector by embedding the data of the user, or an element configured to store the embedded vector in a vector database.

According to still another aspect, the second elements may include at least two of an element configured to generate a vector by embedding the query of the user, an element configured to store the generated vector in a vector database, an element configured to acquire search results by searching the vector database using the generated vector, or an element configured to process the acquired search results.

According to still another aspect, the element configured to preprocess the acquired search results includes an element configured to adjust a ranking of the acquired search results, an element configured to generate a summary of the search results, or a combination thereof.

According to still another aspect, the RAG may include a plurality of different retrievers.

According to still another aspect, the plurality of retrievers may include at least two of a first retriever configured to retrieve data corresponding to an embedded query of the user from a first vector database constructed by splitting and embedding the data of the user based on a first chunk unit with a preset first chunk size, a second retriever configured to retrieve the data corresponding to the embedded query of the user from a second vector database constructed by splitting and embedding the data of the user based on a second chunk unit with a second chunk size having a relatively larger value than the first chunk size, or a third retriever configured to search at least one of the first or second vector databases by generating a structured query using the AI model for the query.

According to still another aspect, the second vector database may be constructed by embedding metadata extracted using the AI model from data split based on the second chunk unit and the data split based on the second chunk unit.

According to at least one example embodiment, there is provided a non-transitory computer-readable recording medium storing instructions that, when executed by a processor, cause the processor to perform the method.

According to at least one example embodiment, there is provided a computer device including at least one processor configured to execute computer-readable instructions; and a non-transitory computer-readable recording medium storing instructions that, when executed by a processor, cause the computer device to, provide a user with a user interface configured to receive, from the user, at least one of a file path for configuration of a retrieval-augmented generation (RAG), a selection of elements predefined for configuration of the RAG, or a combination thereof, to configure the RAG for the user using at least one of a file acquired through the file path entered through the user interface or elements selected by the user from among the predefined elements through the user interface, to generate a response to a query of the user entered through the user interface using the configured RAG and an artificial intelligence (AI) model, and to provide the generated response to the user through the user interface.

According to some example embodiments, a function that allows a user to easily configure RAG and immediately to use the same for search by combining and setting elements of a standardized process for RAG configuration with no-code is provided.

Further areas of applicability will become apparent from the description provided herein. The description and specific examples in this summary are intended for purposes of illustration only and are not intended to limit the scope of the present disclosure.

DETAILED DESCRIPTION

Figure 1:
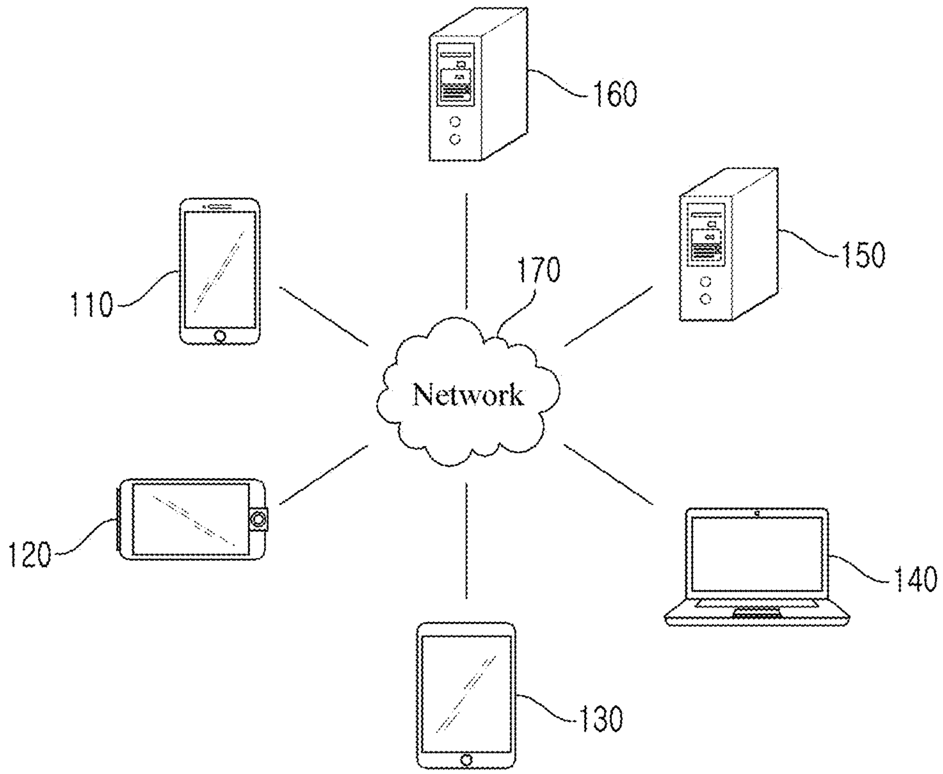
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough, and will fully convey the concepts of this disclosure to those skilled in the art. Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein. Accordingly, descriptions of known processes, elements, and techniques, may be omitted (e.g., not be described) with respect to some example embodiments. Unless otherwise noted, like reference characters denote like elements throughout the attached drawings and written description, and thus descriptions will not be repeated.

As used herein, the singular forms “a,” “an,” and “the,” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups, thereof. As used herein, the term “and/or” includes any and all combinations of one or more of the associated listed products. Expressions such as “at least one of,” when preceding a list of elements, modify the entire list of elements and do not modify the individual elements of the list. Also, the term “exemplary” is intended to refer to an example or illustration.

Also, in the specification, functional elements, including those that process at least one function or operation, may be realized by processing circuitry such as, hardware, software, or a combination of hardware and software. For example, the processing circuitry may include, but is not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

A retrieval-augmented generation (RAG) configuration system according to some example embodiments may be implemented by at least one computer device. Here, a computer program according to some example embodiments may be installed and run on the computer device, and the computer device may perform a RAG configuration method according to some example embodiments, e.g., under control of the computer program. The aforementioned computer program may be stored in a computer-readable record medium to implement the RAG configuration method in conjunction with the computer device. The computer-readable medium may be, for example, a non-transitory computer readable media. The term "non-transitory," as used herein, is a description of the medium itself (e.g., as tangible, and not a signal) as opposed to a limitation on data storage persistency (e.g., RAM vs. ROM).

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only, and the embodiments are not limited thereto. More specifically, the number of electronic devices or the number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be (and/or include) one or more of a smartphone, a mobile phone, a navigation device, a computer, a laptop computer, a digital broadcasting terminal, a personal digital assistant (PDA), a portable multimedia player (PMP), a tablet PC, and/or the like. For example, although FIG. 1 illustrates a shape of a smartphone as an example of the electronic device 110, the electronic device 110 used herein may refer to one of various types of physical computer devices configured to communicate with other electronic devices 120, 130, and 140, and/or with the servers 150 and 160, e.g., over the network 170 in a wireless or wired communication manner.

The communication scheme may include a near field wireless communication scheme between devices as well as a communication scheme using a communication network (e.g., a mobile communication network, wired Internet, wireless Internet, and a broadcasting network) includable in the network 170, but the examples are not limited thereto. For example, the network 170 may include at least one of network topologies that include a personal area network (PAN), a local area network (LAN), a campus area network (CAN), a metropolitan area network (MAN), a wide area network (WAN), a broadband network (BBN), the Internet, a wireless local area network (WLAN) such as a wireless fidelity (Wi-Fi), a wireless personal area network (WPAN) such as Bluetooth, a wireless universal serial bus (USB), Zigbee, near field communication (NFC), radio-frequency identification (RFID), power line communication (PLC), and a communication interface capable of connecting to a mobile cellular network, such as 3rd generation (3G), 4th generation (4G), long term evolution (LTE), and/or the like. Also, the network 170 may include at least one of network topologies that include a bus network, a star network, a ring network, a mesh network, a star-bus network, a tree or hierarchical network, and the like. However, these are provided as examples only.

Each of the servers 150 and 160 may be configured as a computer device (or a plurality of computer devices) that is configured to provide an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170.

Figure 2:
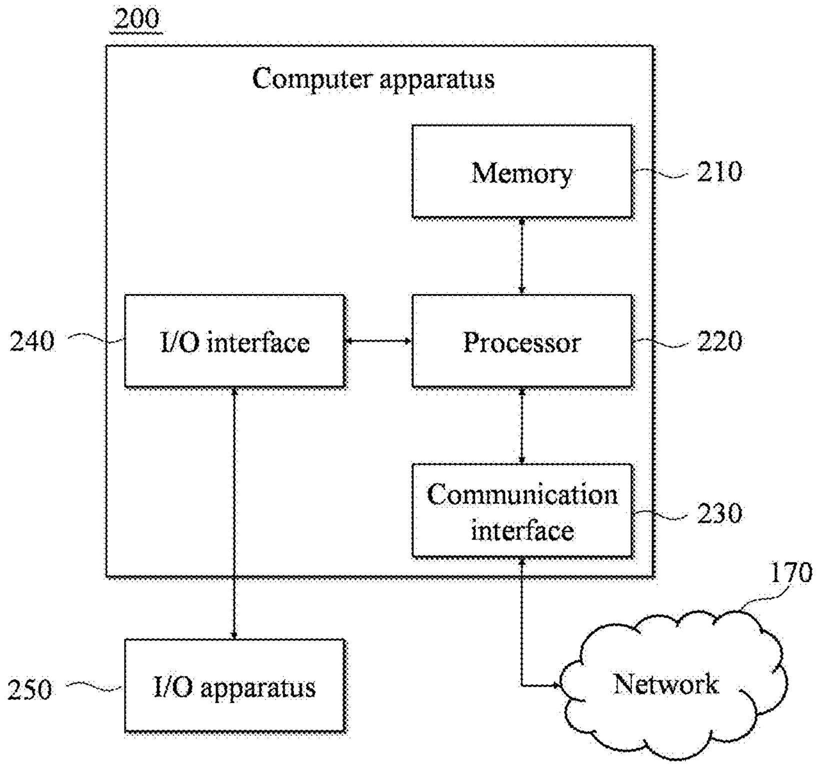
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by (and/or include) a computer device 200 of FIG. 2.

Referring to FIG. 2, the computer device 200, according to at last some embodiments, includes a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. Additionally, in at least some embodiments, a permanent mass storage device, such as ROM and a disk drive, may be included in the computer device 200 as a permanent storage device separate from the memory 210. Also, an operating system OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may be configured to provide a function for communication between the computer device 200 and another apparatus, for example, the aforementioned storage devices, over the network 170. For example, the processor 220 of the computer device 200 may forward a request or an instruction created based on a program code stored in the storage device such as the memory 210, data, and a file, to other apparatuses over the network 170 under control of the communication interface 230.

Inversely, a signal, an instruction, data, a file, etc., from another apparatus may be received at the computer device 200 through the communication interface 230 of the computer device 200. A signal, an instruction, data, etc., received through the communication interface 230 may be forwarded to the processor 220 or the memory 210, and a file, etc., may be stored in a storage medium, for example, the permanent storage device, further includable in the computer device 200.

The input/output (I/O) interface 240 may be configured as an interface with an I/O device 250. For example, an input device may include a device, such as a microphone, a keyboard, a mouse, etc., and an output device may include a device, such as a display, a speaker, etc. As another example, the I/O device 260 may be device in which an input function and an output function are integrated into a single function, such as a touchscreen. At least one of the I/O device 250 may be configured as a single apparatus with the computer device 200. For example, it may be implemented in a form in which a touchscreen, a microphone, a speaker, and/or the like are included in the computer device 200, such as a smartphone.

Also, according to other example embodiments, the computer device 200 may include a greater or smaller number of components than the number of components shown in FIG. 2. However, there is no need to clearly illustrate most conventional components. For example, the computer device 200 may be configured to include at least a portion of the I/O device 250 or may further include other components, such as a transceiver and a database.

Figure 3:
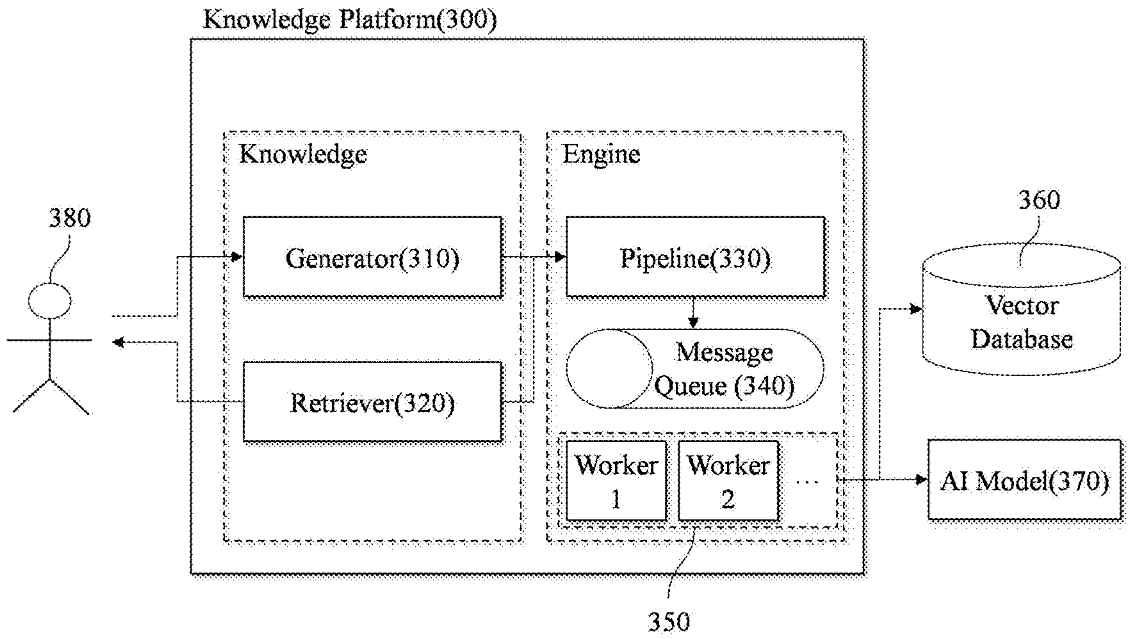
FIG. 3 illustrates an example of a retrieval-augmented generation (RAG) configuration system according to at least one example embodiment.

FIG. 3 illustrates an example of a RAG configuration system according to at least one example embodiment. The RAG configuration system may be implemented as a knowledge platform 300 that is implemented as (and/or in) at least one computer device 200. For example, the knowledge platform 300 may be executed using the memory 210 and the processor 220 of the at least one computer device 200.

The knowledge platform 300, according to at least some embodiments, includes a generator 310, a retriever 320, a pipeline 330, a message queue 340, and a plurality of workers 350. Also, the knowledge platform 300 may be configured to interact with a vector database 360 and an artificial intelligence (AI) model 370. The AI model 370 may, for example, have a structure that is trainable, e.g., with training data, such as an artificial neural network, a decision tree, a support vector machine, a Bayesian network, a genetic algorithm, and/or the like. For example, the vector database 360 may be (and/or be based on) at least one of OpenSearch, Milvus, and/or the like, and/or the AI model 370 may be (and/or be based on) at least one of OpenAI, multilingual-e5.

This knowledge platform 300 may basically provide a user 380 with a service that allows the user 380 to configure RAG as the user 380 desires. In at least one example embodiment, RAG may be easily configured through a process of specifying a file path that the user 380 desires to configure (e.g., entering a uniform resource locator (URL) indicating the file path). In another example embodiment, the user 380 may configure the RAG by selecting elements (workers described with FIGS. 5 and 6) predefined to configure advanced RAG and by setting the pipeline 330. The generator 310 and the retriever 320 may be elements included in the configured RAG. In at least some embodiments, the elements may be configured by, e.g., the producer and selected by the user, and/or may be configured to be updated and/or modified by the user and/or by a service provider.

Also, the knowledge platform 300 may be configured to generate a response to a query delivered from the user 380 using the RAG configured by the user 380 and the AI model 370, and to provide the response to the user 380.

The knowledge platform 300 may be configured such that the user 380 may connect to the knowledge platform 300 using a terminal (e.g., a physical electronic device of the user 380). For example, a computer program such as an application linked with the knowledge platform 300 may be installed and run on the terminal of the user 380, and the terminal of the user 380 may be provided with a service from the knowledge platform 300 through connection to the knowledge platform 300 under control of the running computer program. The query of the user 380 may be input to this terminal and may be delivered to the knowledge platform 300. For example, at least some embodiments, the terminal may be included in an electronic device (e.g., 110, 120, 130, and/or 140) and the knowledge platform 300 may be included in a server (e.g., 150 and/or 160), or both the terminal and the knowledge platform 300 may be included in the electronic device, and the AI model 370 may be included in the server.

Here, the knowledge platform 300 may be configured to generate and provide a response to the query of the user 380 using data related to the user 380. Here, the data of the user 380 may be one or more of data generated and provided by the user 380, data collected on a service for the user 380 while the user 380 uses a specific service, data generated and provided by an administrator of a service in relation to a service used by the user 380, data generated and provided in relation to a service operated by the user 380, and/or the like. For example, the data of the user 380 may include schedule data, a contact list, and shopping information of the user 380. In these cases, the knowledge platform 300 may generate and provide a response using the schedule data, the contact list, and/or the shopping information of the user 380 in response to the query of the user 380. As another example, the data may include information (hereinafter, "chat data") on instant messages transmitted and received in association with an account of the user 380 on an instant messaging service used by the user 380. In these cases, the data may include information on an account that transmits the instant message, an account that receives the instant message, a point in time at which the instant message is transmitted, a point in time at which the instant message is received, and/or content of the instant message. Here, the knowledge platform 300 may generate and provide a response using the chat data of the user 380 in response to the query of the user 380. As another example, the data may include customer consultation related information collected in relation to a customer service (CS) of the service used by the user 380. In these cases, the knowledge platform 300 may generate and provide a chatbot and/or an assistant for the corresponding service using the customer consultation related information, and the chatbot and/or the assistant of the corresponding service may provide a response using the customer consultation related information in response to the query of the user 380. As another example, the data may include information on a product being sold on the service operated by the user 380. In these cases, in response to the query of the user 380, the knowledge platform 300 may generate and provide various responses related to the product, such as a marketing plan or a service operation plan using information on the product.

The knowledge platform 300 may initially index the data. For example, the knowledge platform 300 may receive a chat data file in an SQLite format and/or text from the instant messaging service. Then, the knowledge platform 300 may analyze the received chat data file (e.g., parse data in the form of text, CSV, Markdown, image, and/or the like), and may extract metadata (e.g., transmission time of the instant message, reception time of the instant message, speaker (account of the instant messaging service), keyword to content of the instant message, summary to content of the instant message, and/or the like).

Also, the knowledge platform 300 may split the chat data based on a chunk unit (e.g., character unit, semantic unit, and/or the like). Also, the knowledge platform 300 may generate a vector by embedding the chat data of the chunk unit, and may store the generated vector in a vector database 360. The chat data of the chunk unit may also include information (keyword, summary, metadata, etc.) extracted from the data. Embedding may be performed using at least one OpenAI, multilingual-e5. and/or the like. Meanwhile, at least one of OpenSearch, Milvus. and/or the like, may be used as the vector database 360, but the examples are not limited thereto.

After the vector generated by embedding the data is stored in the vector database 360, the knowledge platform 300 may receive the query from the user 380. In these cases, the knowledge platform 300 may retrieve information related to the query of the user 380 from the vector database 360. Here, the knowledge platform 300 may simultaneously use a plurality of search engines (e.g., a plurality of retrievers) for search advancement. Which of the plurality of retrievers is selected and/or the configuration of the plurality of retrievers may be based on the configuration of the RAG. Table 1 below shows an example of three search engines including an artificial neural network (ANN) and a meta data filter.

TABLE 1

| Retriever | Engine | Chunk size | Chunk overlap | top_k |
|---|---|---|---|---|
| Small chunk embedding | ANN | 256 | 16 | 3 |
| Metadata embedding | ANN | 800 | 64 | 5 |
| Self-query | ANN + MetaDataFilter | 512 | 64 | 7 |

Each of small chunk embedding and metadata embedding may be indexing technology for generating and utilizing a different vector storage by splitting and indexing the data of the user 380 into chunks with a different size.

For example, for the small chunk embedding, the knowledge platform 300 may generate a first vector storage by splitting and embedding the data based on a chunk unit with a first chunk size. Here, a small chunk embedding retriever may retrieve data associated with the query of the user 380 from the first vector storage. Here, the small chunk embedding may mechanically split the data into chunks with the first chunk size, but may also split a chunk based on a proposition unit using a large language model (LLM) depending on example embodiments.

For the metadata embedding, the knowledge platform 300 may primarily extract content that requires inference from the data through the LLM and store the same as metadata and then, may generate a second vector storage by embedding information that includes original text and the metadata. Here, a second chunk size for the metadata embedding may be preset to have a relatively larger value than the first chunk size for the small chunk embedding. In these cases, a metadata embedding retriever may retrieve data associated with the query of the user 380 from the second vector storage. For example, the knowledge platform 300 may extract metadata, such as "2023 Sep. 18 AAA meeting," from the original text such as "2023 Sep. 15 (Fri)/Hong Gil-dong/has AAA meeting on the next Monday." Then, the knowledge platform 300 may extract an embedding that includes the original text "2023 Sep. 15 (Fri)/Hong Gil-dong/has AAA meeting on the next Monday" and the metadata "2023 Sep. 18 AAA meeting" and may store the embedding in the second vector storage. The metadata, like this date, may increase search accuracy when the metadata embedding retriever conducts a predetermined search later. Also, the extracted metadata may improve the performance of a reply generation model by adding a prompt for a later response generation.

As the name suggests, a self-query retriever may be a retriever configured to having the capability of querying itself. In detail, if a natural language query is given, the self-query retriever may generate a structured query using an LLM chain that constitutes the query and then may apply the structured query to the basic vector database 360. Through this, the self-query retriever may use a use input query to compare semantic similarity with content of a stored document and may extract a filter from a user query on metadata of the stored document and may execute the corresponding filter. For example, if a natural language query, such as "tell me about last week's schedule," the self-query retriever may generate and utilize a metadata filter as a structured query including a first and a second date, such as "2023/12/12<=date<=2023/12/18."

Also, in the example of Table 1, "top_k" may represent the number of search results to be retrieved for each retriever. To increase and/or optimize the performance of a corresponding retriever, the number of search results to be retrieved from each constructed retriever (i.e., "top_k") needs to be appropriately determined. An appropriate value of "top_k" may be different for each domain and each piece of data even for the same retriever.

To this end, a value of "top_k" may be tuned through qualitative assessment and/or quantitative assessment. For example, to use the qualitative assessment, a value of "top_k" may be tuned through performance assessment for each retriever over a set of questions (date, person, information, etc.) of a specific category. As another example, to use the quantitative assessment, a value of "top_k" may be tuned through performance assessment for each retriever using a well-known solution (e.g., RAG Assessment (Ragas)) to assess LLM generation text for providing insight into a RAG pipeline.

Also, the maximum number of chunks retrievable for each retriever may be "top_k," but the number of search results retrieved for each retriever depending on a query may be changed to "top_k" or less. For example, when the self-query retriever generates and utilizes a filter related to "date," the number of search results for a user query that does not include date information may be 0. Also, although each retriever extracts up to "top_k" search results, search results with low correlation to the query may be excluded through postprocessing as follows.

Similarity-based: Among "top_k" search results, search results of which similarity to the query is less than or equal to a preset threshold may be excluded.

LLM-based: Similarity-based search results may be biased with respect to a specific keyword, so search results different from an actual query in context may be extracted. To compensate for this, whether there is a relationship between the query and search results (each of "top_k" search results) may be verified by calling an LLM and search results determined to be irrelevant may be excluded.

Recency-based: Each retriever may extract "top_k" or more search results and may use k data that includes the most recent data among the extracted search results as search results.

Therefore, the knowledge platform 300 may perform the role of an assistant that supports decision of the user 380 based on experience or knowledge of the user 380 and analyzed personality of the user 380, using the data of the user 380. Also, the knowledge platform 300 may also perform the role of an assistant that analyzes information and patterns of the user 380 and recommends customized schedule or information (e.g., preferred shopping list).

Also, the knowledge platform 300 may also perform the function according to the query in addition to providing a response to the query of the user 380. For example, the knowledge platform 300 may be linked to a specific function, tool, and/or the like. A case in which the knowledge platform 300 is linked with a specific collaboration tool (e.g., Slack) may be considered. Here, it is assumed that the user 380 enters the query "send summary of May schedule to Slack" or "send next week's schedule in Markdown format to Slack team_xx channel." In this case, rather than simply generating the response to the query and providing the response to the user 380, the knowledge platform 300 may summarize "May schedule" retrieved based on the indexed data and transmit the same to an account of the user 380 in the linked collaboration tool, or may convert "Next week's schedule" retrieved based on the indexed data to the Markdown format and transmit the same to "team_xx channel" in the linked collaboration tool. As another example, when the knowledge platform 300 is linked to a calendar tool, the knowledge platform 300 may register a schedule retrieved based on the data in response to the query of the user 380, to a calendar of the user 380.

Figure 4:
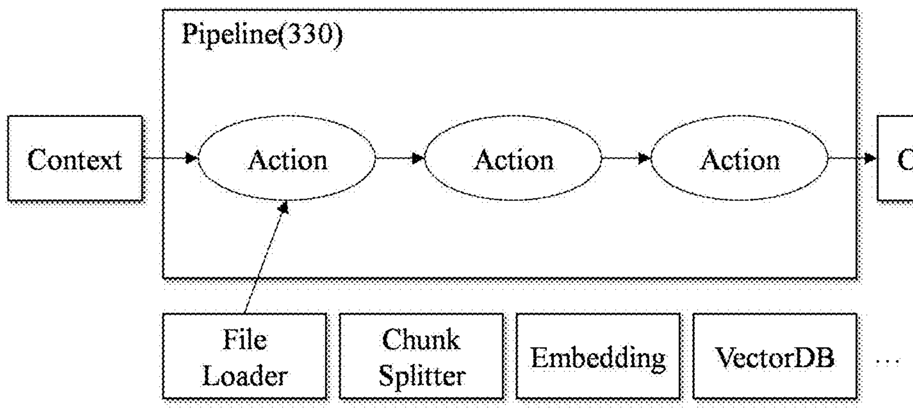
FIG. 4 illustrates an example of a configuration of a pipeline according to at least one example embodiment.

FIG. 4 illustrates an example of a configuration of a pipeline according to at least one example embodiment. In FIG. 4, the pipeline 330 links an action of the pipeline 330 with a worker (e.g., File Loader, Chunk Splitter, Embedding, VectorDB, etc.) according to RAG configuration of the user 380, and the pipeline 330 may control an operation of RAG configured by the user 380 to be processed by operating a worker in order of a corresponding action using the message queue 340. The example illustrated in FIG. 4 represents an example of controlling an operation of loading a file associated with context to be performed through the worker "File Loader" linked with a first action as the first action of the pipeline 330, however the example embodiments are not limited thereto.

Figure 5:
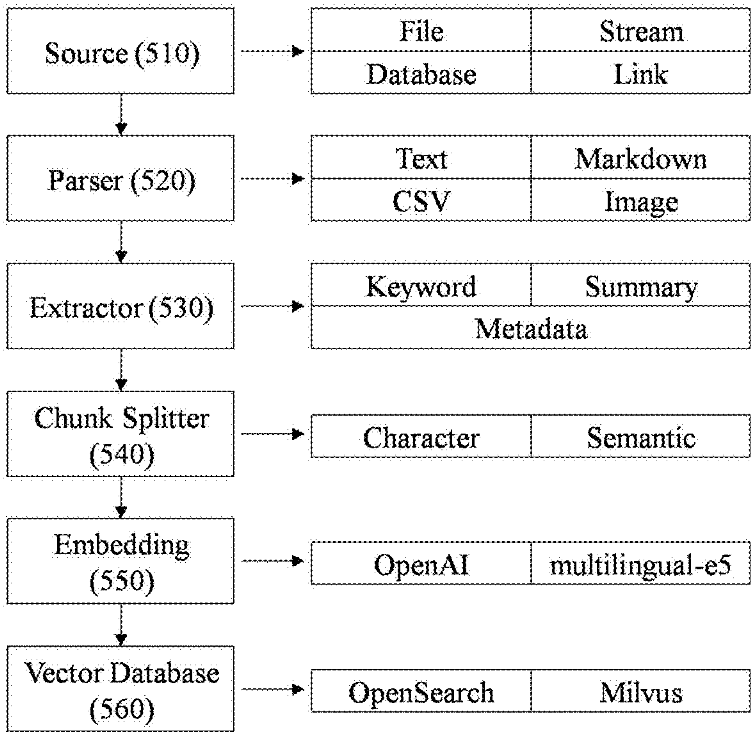
FIG. 5 illustrates an example of a pipeline configuration for data indexing according to at least one example embodiment.
Figure 6:
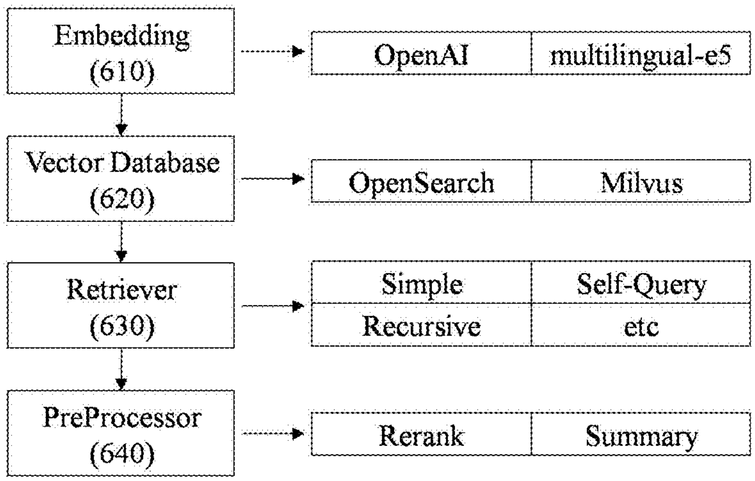
FIG. 6 illustrates an example of a pipeline configuration for a retriever according to at least one example embodiment.

FIG. 5 illustrates an example of a pipeline configuration for data indexing according to at least one example embodiment, and FIG. 6 illustrates an example of a pipeline configuration for a retriever according to at least one example embodiment.

The example embodiment of FIG. 5 refers to an example of the pipeline configuration and represents that workers of a source 510, a parser 520, an extractor 530, a chunk splitter 540, an embedding 550, and a vector database 560 may be sequentially linked with actions of the pipeline 330. At least one worker may be excluded, and/or a new worker may be added depending on RAG configuration of the user 380.

The source 510 may represent a source to data of the user 380. The data may be present in various forms, such as a file, a stream, a database, and a link, and the pipeline 330 may acquire the data of the user 380 from the source 510 present in various forms in an action linked with the source 510. As described above, the data may be data generated and provided by the user 380, data collected on a service for the user 380 while the user 380 uses a specific service, data generated and provided by an administrator of the service in relation to a service used by the user 380, or data generated and provided in relation to a service operated by the user 380.

The parser 520 may be a worker as a tool for analyzing the syntax of the data of the user 380. The data may include data in the form of text, Markdown, CSV, and/or image, and the pipeline 330 may parse the data in various forms using the parser 520 in an action linked with the parser 520.

The extractor 530 may be a worker as a tool that extracts a keyword, a summary, and metadata from the parsed data of the user 380. The pipeline 330 may extract various information from the data using the extractor 530 in an action linked with the extractor 530.

The chunk splitter 540 may be a worker as a tool that splits the data of the user 380 into a plurality of chunks. The pipeline 330 may mechanically or semantically split the data of the user 380 into the plurality of chunks using the chunk splitter 540 in an action linked with the chunk splitter 540.

The embedding 550 may be a worker that generates a vector by embedding the data of the user 380 in chunk unit. As described above, the embedding 550 may be performed using at least one of already known solutions, such as OpenAI and multilingual-e5. The pipeline 330 may generate the vector for each chunk unit by embedding the data of the user 380 in chunk unit in an action linked with the embedding 550.

The vector database 560 may be a worker for storing the vector generated through the embedding 550, and may store the vector in the aforementioned vector database 360. As described above, at least one of already known solutions, such as OpenSearch and Milvus, may be utilized as the vector database 360, but it is not limited thereto. The pipeline 330 may store the vector generated through the embedding 550 in the vector database 360 in an action linked with the vector database 560.

The user 380 may link various workers with actions of the pipeline 330 for data indexing, and may process a process of indexing the data of the user 380 through the workers in order of the actions.

The example embodiment of FIG. 6 refers to an example of the pipeline configuration for a retriever and represents that workers of an embedding 610, a vector database 620, a retriever 630, and a preprocessor 640 may be sequentially linked with actions of the pipeline 330. At least one worker may be excluded, and/or a new worker may be added depending on RAG configuration of the user 380.

The embedding 610 may be a worker that generates a vector by embedding the query of the user 380. The pipeline 330 may generate the vector for the query by embedding the query of the user 380 in an action linked with the embedding 650.

The vector database 620 may be a worker for storing the vector generated for the query in the vector database 360.

The retriever 630 may be a worker for acquiring search results by searching the vector database 360 using the vector for the query of the user 380.

The preprocessor 640 may be a worker for adjusting the ranking of search results retrieved through the retriever 630 or generating a summary of the search results.

The user 380 may link these various workers with actions of the pipeline 330 for the retriever 630, and may process a process of retrieving data of the user 380 corresponding to the query of the user 380 through the workers in order of the actions.

The knowledge platform 300 may provide a user interface for the user 380 to select predefined workers and to configure the pipeline 330. Thereby, the knowledge platform 300 may enable a user to select and/or adjust the configuration of the RAG without adjusting the network infrastructure and/or without requiring a technical familiarity with the RAG source library and/or coding. As such, the RAG may be configured to be more accessible to lay users of the LLM; and thereby improving the output of the LLM based on the user's inputs and data.

Figure 7:
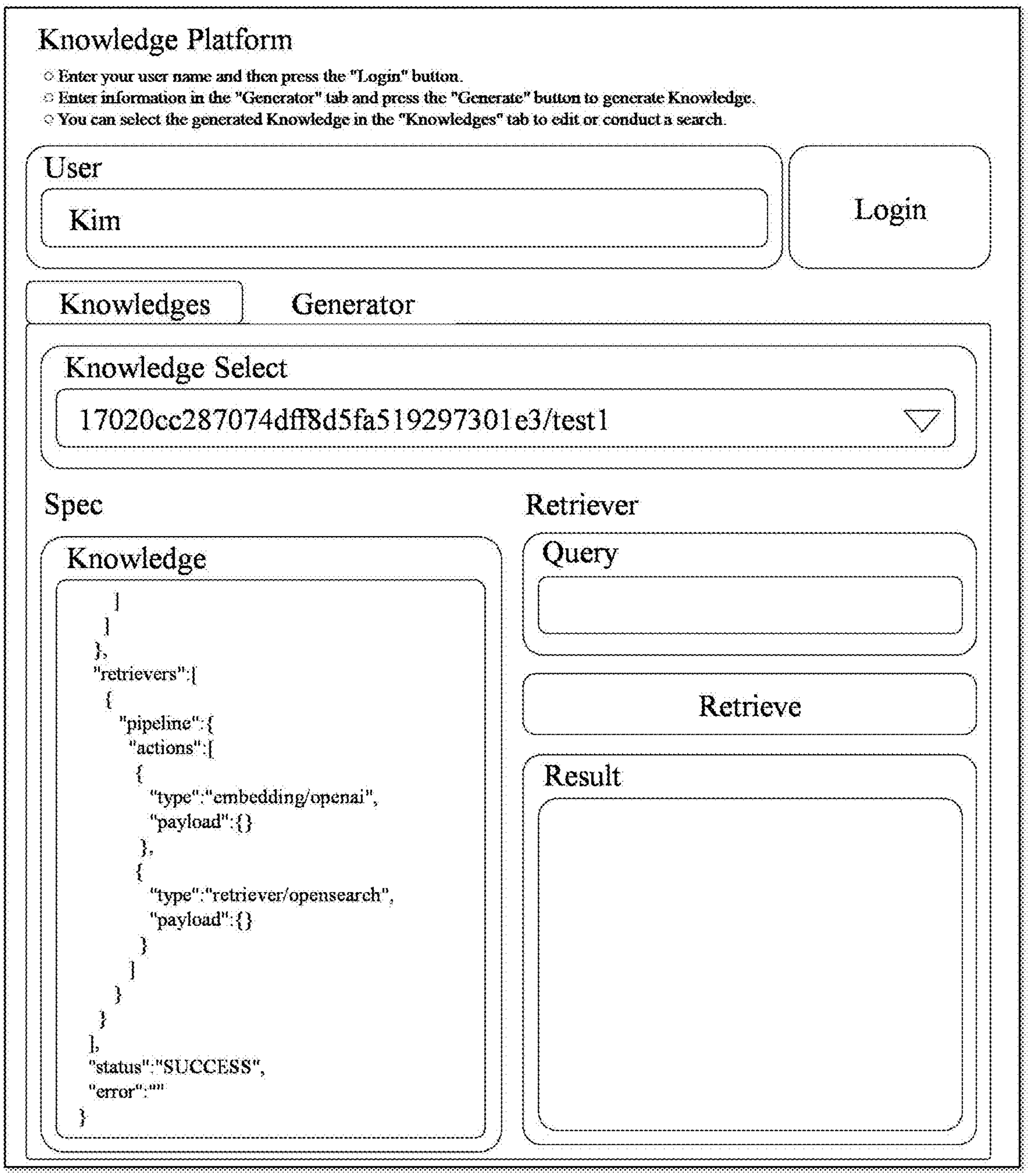
FIGS. 7 to 9 illustrate examples of a user interface for configuring RAG according to at least one example embodiment.
Figure 8:
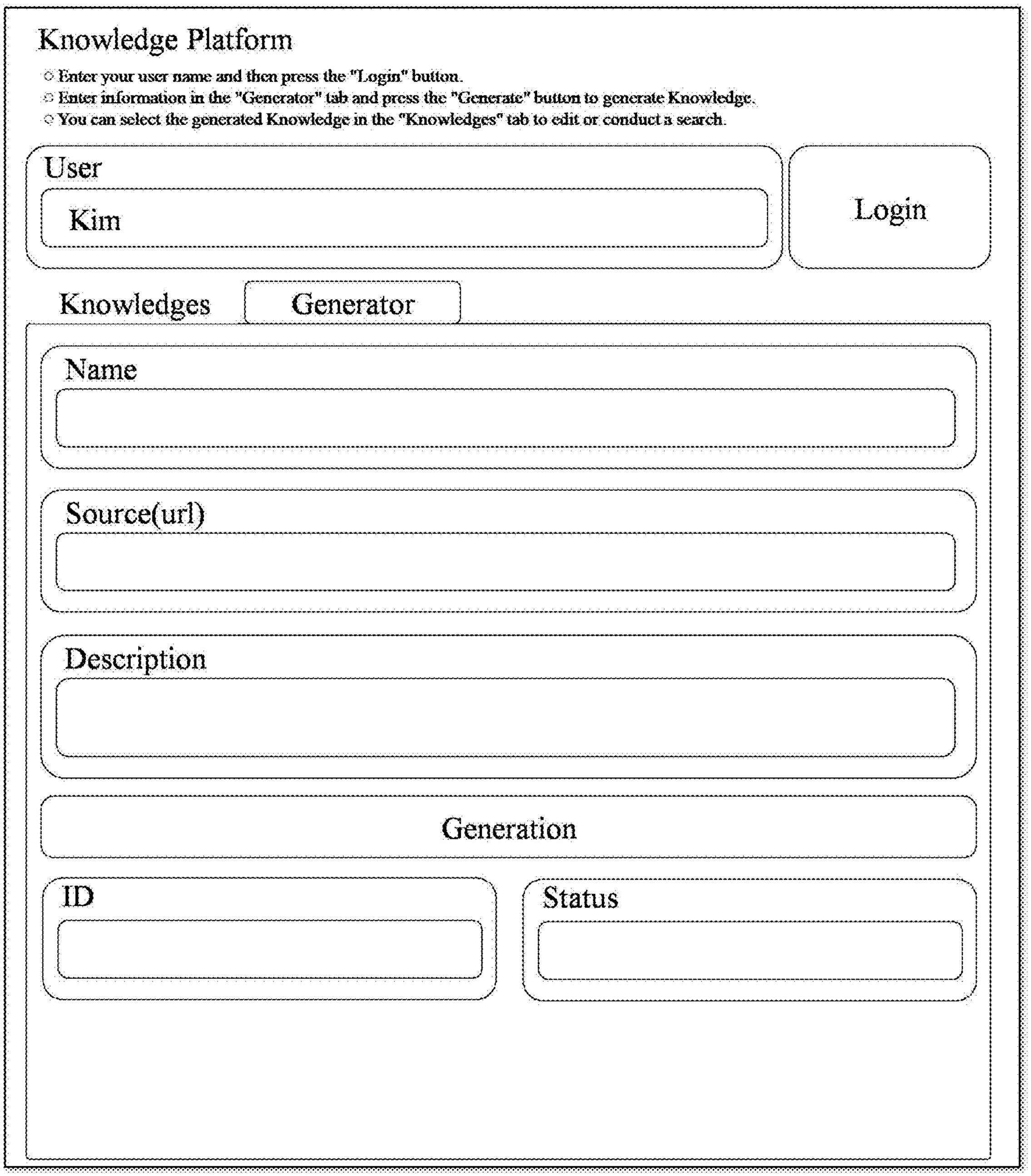
Figure 9:
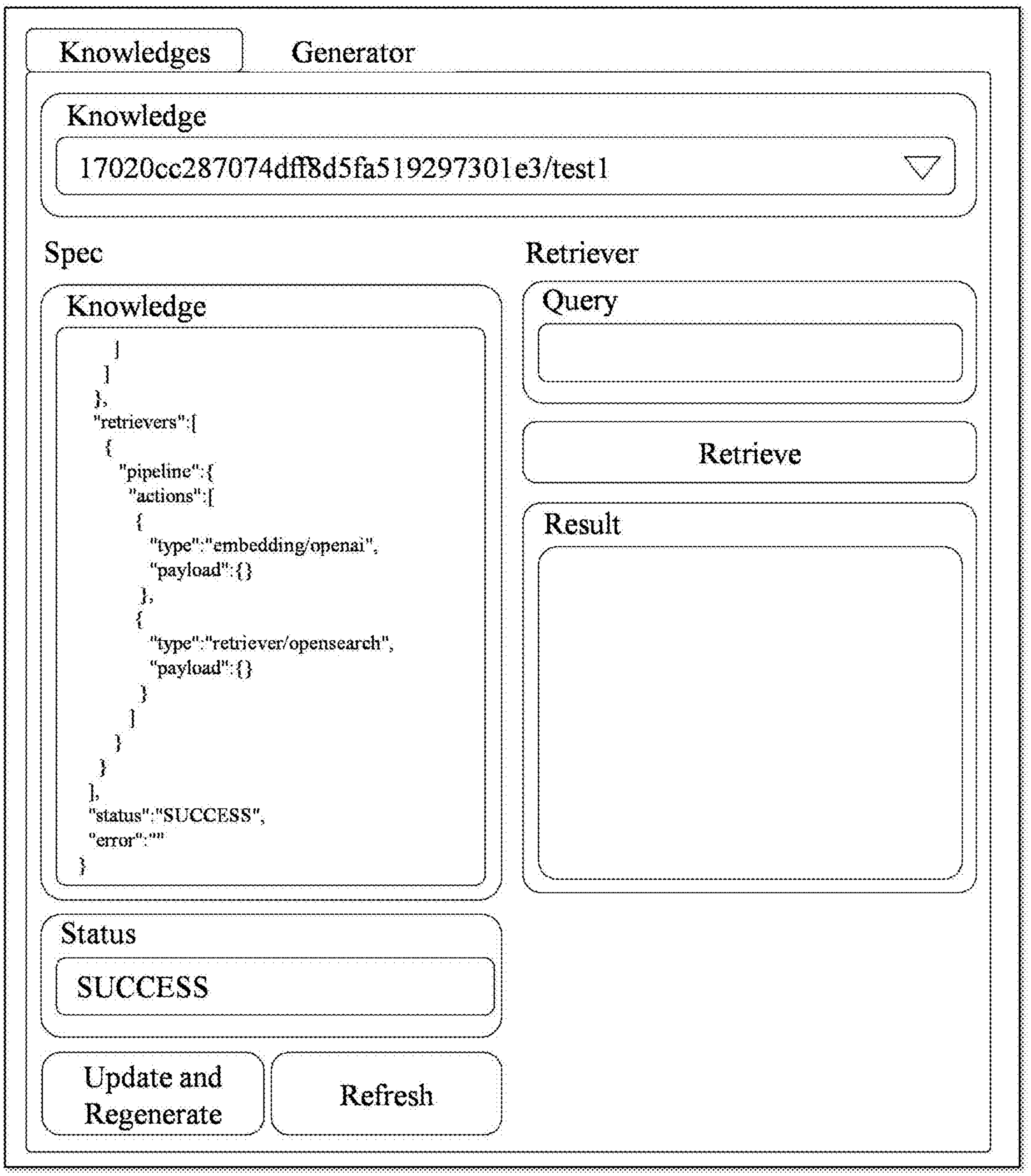

FIGS. 7 to 9 illustrate examples of a user interface for configuring RAG according to at least one example embodiment.

FIG. 7 shows an example of a user interface that allows the user 380 to enter a username (e.g., the username "Kim" entered to "User" item of FIG. 7) and then press "Login" button to log in. The user interface of FIG. 7 represents an area for displaying settings of knowledge pipeline (e.g., area of "Spec" item of FIG. 7) and an area for receiving a query of the user 380 (e.g., area of "Query" item of FIG. 7), and a button for starting a search for the query of the user 380 (e.g., "Retriever" button of FIG. 7). Also, the user interface of FIG. 7 represents an area for displaying search results for the query of the user 380 (e.g., area of "Result" item of FIG. 7).

FIG. 8 shows an example of a user interface that allows the user 380 to generate a knowledge pipeline. The user interface of FIG. 8 represents an area for receiving a name of the knowledge pipeline (e.g., area of "Name" item of FIG. 8), an area for receiving a file path for RAG configuration from the user 380 (e.g., area of "Source (url)" item of FIG. 8), an area for receiving description related to the knowledge pipeline (e.g., area of "Description" item of FIG. 8), and a button for starting generation of the knowledge pipeline (e.g., "Generate" button of FIG. 8). When the user 380 enters information and then selects the "Generate" button on "Generator" tab of FIG. 8, the knowledge pipeline according to the entered information may be generated.

FIG. 9 shows a user interface that includes information on the knowledge pipeline generated by the user 380. The user 380 may wait until "Status" becomes "SUCCESS" after selecting the knowledge pipeline generated by the user 380 through the "Knowledge Select" item. If necessary, the user 380 may refresh the corresponding knowledge pipeline through "Refresh" button.

If "Status" is "SUCCESS," the user 380 may start a search for the query of the user 380 through an area for receiving the query of the user 380 (e.g., area of "Query" item of FIG. 9) and a button for starting a search for the query of the user 380 (e.g., "Retriever" button of FIG. 9). Search results for the query may be displayed on an area for displaying the search results (e.g., area of "Result" area of FIG. 9).

If necessary, the user 380 may regenerate the knowledge pipeline by changing settings of the knowledge pipeline and then selecting "Update and Regenerate" button.

Table 2 below shows an example of settings of the knowledge pipeline.

TABLE 2

```
■ Knowledge pipeline spec
   ■ sample
   ■ "generator": {
   ■       "pipeline": {
   ■           "actions": [
   ■               {
   ■                 "type": "loader/line-message",
   ■                 "payload": {
   ■                   "paths":
     ["https://mlu-marketplace-repo.linecorp.com/models/ai-communication/knowl
     edge-test/raw/commit/928d2fad3f5c494c30e89f28e673c3edba9d0319/sample.
     sqlite"],
   ■                   "type": "sqlite",
   ■                   "start_year": "2010",
   ■                   "start_month": "1"
   ■                 }
   ■               },
   ■               {
   ■                 "type": "transformer/splitter",
   ■                 "payload": {
   ■                   "chunk_size": 512,
   ■                   "chunk_overlap": 64
   ■                 }
   ■               },
   ■               {
   ■                 "type": "extractor/summary",
   ■                 "payload": {
   ■                   "model": "gpt-4",
   ■                   "temperature": 0.1,
   ■                   "prompt": "You are a secretary who
     checks important schedules, such as
     meetings/conferences/presentations/school/appointments,
     ~~~~"In"""\n\nSummary:"
   ■                 }
   ■               },
   ■               {
   ■                 "type": "embedding/openai",
   ■                 "payload": {
   ■
       "model": "openai-v3-largexxxx"
   ■                         }
   ■               },
   ■               {
   ■                 "type": "store/opensearch",
   ■                 "payload": { }
   ■               }
   ■           ]
```

TABLE 2-continued

```
          }
      },
      "retrievers": [
        {
            "name": "simple",
            "pipeline": {
              "actions": [
                {
                  "type": "embedding/openai",
                  "payload": { }
                },
                {
                  "type": "retriever/opensearch",
                  "payload": { }
                }
              ]
            }
          },
          {
            "name": "self",
            "pipeline": {
              "actions": [
                {
                  "type": "embedding/openai",
                  "payload": { }
                },
                {
                  "type":
"retriever/opensearch-selfquery",
                  "payload": {
                    "model": "gpt-4",
                    "content": "Conversation
messages with sender",
                    "metas": [
                      {
                        "name": "date",
                        "description": "The
date the message was sent. The format of the data is 'year-month-day'.",
                        "type": "str"
                      }
                    ]
                  }
                }
              ]
            }
          }
      ]
```

Figure 10:
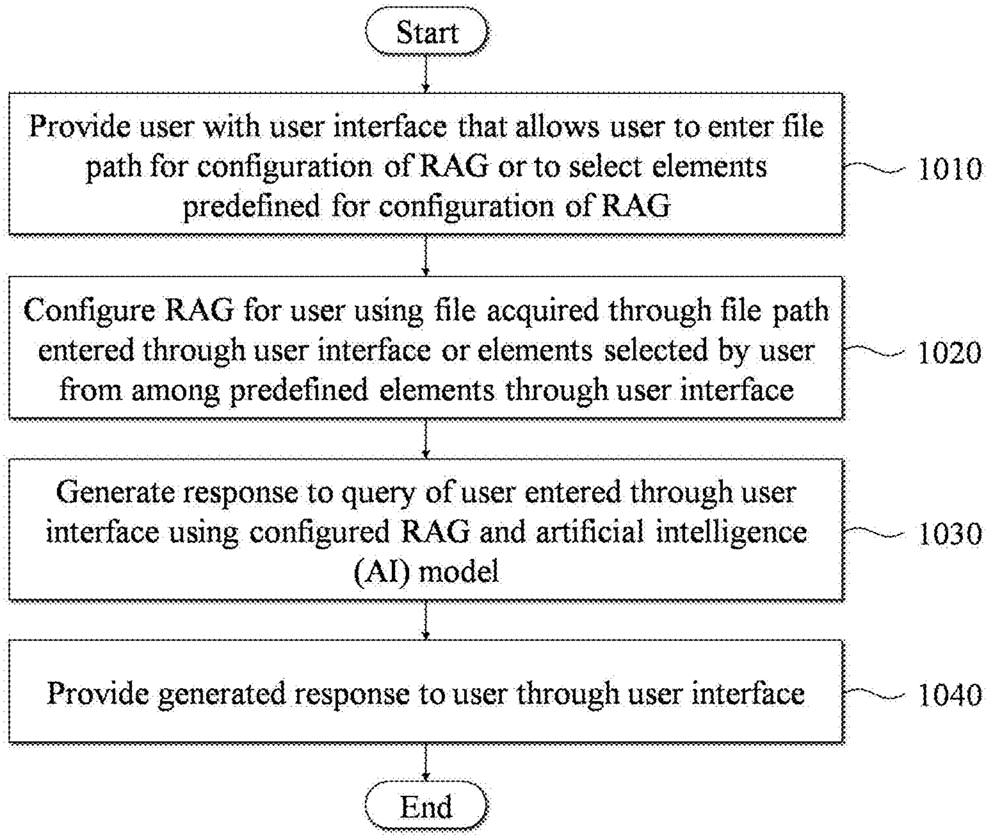
FIG. 10 illustrates an example of a RAG configuration method according to at least one example embodiment.

FIG. 10 is a flowchart illustrating an example of a RAG configuration method according to at least one example embodiment. The RAG configuration method according to the at least one example embodiment may be performed by at least one computer device 200. Here, the processor 220 of the computer device 200 may be implemented to execute a control instruction according to a code of at least one computer program or a code of an operating system included in the memory 210. Here, the processor 220 may control the computer device 200 to perform operations 1010 to 1040 included in the method of FIG. 10 in response to a control instruction provided from a code stored in the computer device 200.

In operation 1010, the computer device 200 may provide a user with a user interface that allows the user to enter a file path for configuration of RAG or to select elements predefined for configuration of the RAG. An example of providing a user interface for entering a URL as a file path for configuration of RAG is described above with reference to FIG. 8. Also, an example of configuring a pipeline by selecting predefined elements is described above with reference to FIGS. 5 and 6.

In operation 1020, the computer device 200 may configure the RAG for the user using a file acquired through the file path entered through the user interface or elements selected by the user from among the predefined elements through the user interface. For example, the computer device 200 may configure a knowledge pipeline for the RAG by linking elements included in the acquired file or the selected elements to actions of the knowledge pipeline. For example, the computer device 200 may configure a first pipeline according to combination of first elements for indexing data of the user, and may configure a second pipeline according to combination of second elements for retrieving data of the user to the query of the user.

In at least one example embodiment, the first elements may include at least two of an element for acquiring the data of the user, an element for analyzing the syntax of the data of the user, an element for extracting at least one of a keyword, a summary, and metadata from the data of the user, an element for splitting the data of the user into a plurality of chunks, an element for generating a vector by embedding the data of the user, and an element for storing the embedded vector in a vector database. Also, the second elements may include at least two of an element for generating a vector by embedding the query of the user, an element for storing the generated vector in a vector database, an element for acquiring search results by searching the vector database using the generated vector, and an element for preprocessing the retrieved search results. Here, the element for preprocessing the retrieved search results may include an element for adjusting ranking of the retrieved search results or generating a summary of the search results.

Depending on the example embodiments, the computer device 200 may configure RAG that includes a plurality of retrievers different from each other. Here, the plurality of retrievers may include at least two of a first retriever that retrieves data corresponding to an embedded query of the user from a first vector database constructed by splitting and embedding the data of the user based on a first chunk unit with a preset first chunk size, a second retriever that retrieves the data corresponding to the embedded query of the user from a second vector database constructed by splitting and embedding the data of the user based on a second chunk unit with a second chunk size having a relatively larger value than the first chunk size, and a third retriever that searches the vector database by generating a structured query using an AI model for the query. Here, the second vector database may be constructed by embedding metadata extracted using the AI model from data split based on the second chunk unit and data split based on the second chunk unit.

In operation 1030, the computer device 200 may generate a response to a query of the user entered through the user interface using the configured RAG and the AI model. Here, the computer device 200 may sequentially operate workers corresponding to elements linked with actions in order of the actions of the knowledge pipeline.

In operation 1040, the computer device 200 may provide the generated response to the user through the user interface. As described above, the response to the query of the user may be displayed through the "Result" item of FIGS. 7 and 9 above.

As described above, according to some example embodiments, it is possible to provide a function that allows a user to easily configure RAG and immediately use the same for search by combining and setting elements of a standardized process for RAG configuration with no-code.

The systems or the apparatuses described above may be implemented using hardware components, software components, and/or combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of the processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, or in a propagated signal wave capable of providing instructions or data to or being interpreted by the processing device. The software also may be distributed over network coupled computer devices so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may include, alone or in combination with program instructions, data files, data structures, and the like. Here, the media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media may include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of the program instructions include an advanced language code that may be executed by a computer using an interpreter as well as a machine language code as produced by a compiler.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A retrieval-augmented generation (RAG) configuration method of a computer device comprising at least one processor, the method comprising:

providing, by the at least one processor, a user with a user interface configured to receive, from the user, at least one of a file path for configuration of the RAG, a selection of elements predefined for configuration of the RAG, or a combination thereof;

configuring, by the at least one processor, the RAG for the user using at least one of a file acquired through the file path entered through the user interface or elements selected by the user from among the predefined elements;

generating, by the at least one processor, a response to a query of the user, entered through the user interface, using the configured RAG and an artificial intelligence (AI) model; and providing, by the at least one processor, the generated response to the user through the user interface, wherein the configured RAG includes a plurality of different retrievers comprising:

a first retriever configured to retrieve data corresponding to an embedded query of the user from a first vector database constructed by splitting and embedding data of the user based on a first chunk unit with a preset first chunk size, and a second retriever configured to retrieve the data corresponding to the embedded query of the user from a second vector database constructed by splitting and embedding the data of the user based on a second chunk unit with a second chunk size having a relatively larger value than the first chunk size, and wherein the second vector database is constructed by embedding metadata extracted using the artificial intelligence (AI) model from data split based on the second chunk unit and the data split based on the second chunk unit.

2. The method of claim 1, wherein the configuring of the RAG comprises configuring a knowledge pipeline for the RAG by linking elements included in the acquired file or the selected elements to actions of the knowledge pipeline, and the generating the response comprises sequentially operating workers corresponding to elements linked to the actions in order of the actions of the knowledge pipeline.

3. The method of claim 1, wherein the configuring of the RAG comprises configuring a first pipeline according to a combination of first elements, the first elements configured to index data of the user; and configuring a second pipeline according to combination of second elements, the second elements configured to retrieve data of the user to the query of the user.

4. The method of claim 3, wherein the first elements include at least two of element configured to acquire the data of the user, an element configured to analyze a syntax of the data of the user, an element configured to extract at least one of a keyword, a summary, or metadata from the data of the user, an element configured to split the data of the user into a plurality of chunks, an element configured to generate a vector by embedding the data of the user, or an element configured to store the embedded vector in a vector database.

5. The method of claim 3, wherein the second elements include at least two of an element configured to generate a vector by embedding the query of the user, an element configured to store the generated vector in a vector database, an element configured to acquire search results by searching the vector database using the generated vector, or an element configured to process the acquired search results.

6. The method of claim 5, wherein the element configured to preprocess the acquired search results includes an element configured to adjust a ranking of the acquired search results, an element configured to generate a summary of the search results, or a combination thereof.

7. The method of claim 1, wherein the plurality of retrievers further include a third retriever configured to search at least one of the first or second vector databases by generating a structured query using the AI model for the query.

8. A non-transitory computer-readable recording medium storing instructions that, when executed by a processor, cause the processor to perform the method of claim 1.

9. A computer device comprising:

at least one processor configured to execute computer-readable instructions; and a non-transitory computer-readable recording medium storing instructions that, when executed by a processor, cause the computer device to provide a user with a user interface configured to receive, from the user, at least one of a file path for configuration of a retrieval-augmented generation (RAG), a selection of elements predefined for configuration of the RAG, or a combination thereof, configure the RAG for the user using at least one of a file acquired through the file path entered through the user interface or elements selected by the user from among the predefined elements through the user interface, generate a response to a query of the user entered through the user interface using the configured RAG and an artificial intelligence (AI) model, and provide the generated response to the user through the user interface, wherein the configured RAG includes a plurality of different retrievers comprising:

a first retriever configured to retrieve data corresponding to an embedded query of the user from a first vector database constructed by splitting and embedding data of the user based on a first chunk unit with a preset first chunk size, and a second retriever configured to retrieve the data corresponding to the embedded query of the user from a second vector database constructed by splitting and embedding the data of the user based on a second chunk unit with a second chunk size having a relatively larger value than the first chunk size, and wherein the second vector database is constructed by embedding metadata extracted using the artificial intelligence (AI) model from data split based on the second chunk unit and the data split based on the second chunk unit.

10. The computer device of claim 9, wherein, the configure the RAG includes configuring, by the computer device, a knowledge pipeline for the RAG by linking elements included in the acquired file or the selected elements to actions of the knowledge pipeline, and the generate the response includes sequentially operating, by the computer device, workers corresponding to elements linked to the actions in order of the actions of the knowledge pipeline.

11. The computer device of claim 9, wherein the configure the RAG includes configure a first pipeline according to a combination of first elements, the first elements configured to index data of the user, and configure a second pipeline according to combination of second elements, the second elements configured to retrieve data of the user to the query of the user.

12. The computer device of claim 11, wherein the first elements include at least two of an element configured to acquire the data of the user, an element configured to analyze a syntax of the data of the user, an element configured to extract at least one of a keyword, a summary, or metadata from the data of the user, an element configured to split the data of the user into a plurality of chunks, an element configured to generate a vector by embedding the data of the user, or an element configured to store the embedded vector in a vector database.

13. The computer device of claim 11, wherein the second elements include at least two of an element configured to generate a vector by embedding the query of the user, an element configured to store the generated vector in a vector database, an element configured to acquire search results by searching the vector database using the generated vector, and an element configured to preprocess the acquired search results.

* * * * *